(12) United States Patent
Elliott et al.

(10) Patent No.: US 8,771,406 B1
(45) Date of Patent: Jul. 8, 2014

(54) TRANSPORT TANK WITH HIGH CAPACITY GAS SCRUBBING

(71) Applicants: Ken Elliott, Sundre (CA); Sonya Elliott, Sundre (CA)

(72) Inventors: Ken Elliott, Sundre (CA); Sonya Elliott, Sundre (CA)

( * ) Notice: Subject to any disclaimer, the term of this patent is extended or adjusted under 35 U.S.C. 154(b) by 0 days.

(21) Appl. No.: 13/772,652

(22) Filed: Feb. 21, 2013

(51) Int. Cl.
*B01D 53/02* (2006.01)

(52) U.S. Cl.
USPC ......... 96/108; 95/92; 95/136; 96/121; 96/131

(58) Field of Classification Search
USPC .................. 95/92, 136; 96/108, 121, 131
See application file for complete search history.

(56) References Cited

U.S. PATENT DOCUMENTS

| | | | | |
|---|---|---|---|---|
| 3,389,536 | A | * | 6/1968 | Bull .................................. 96/184 |
| 3,581,782 | A | | 6/1971 | Onufer |
| 3,776,283 | A | | 12/1973 | Kramer et al. |
| 3,844,746 | A | * | 10/1974 | Kutryk ............................. 96/237 |
| 5,971,009 | A | * | 10/1999 | Schuetz et al. ................. 137/312 |
| 6,193,786 | B1 | * | 2/2001 | Henderson ....................... 95/171 |
| 6,382,240 | B1 | | 5/2002 | MacDonald |
| 7,147,689 | B1 | * | 12/2006 | Miller .............................. 95/92 |
| 7,297,181 | B2 | * | 11/2007 | Zhou et al. ....................... 95/11 |
| 8,133,300 | B1 | * | 3/2012 | Gonsalves et al. ............... 95/19 |
| 8,337,763 | B1 | * | 12/2012 | St. Amant et al. ............ 422/180 |
| 2005/0089455 | A1 | | 4/2005 | Marganski et al. |
| 2012/0199508 | A1 | | 8/2012 | Hebblethwaite |

FOREIGN PATENT DOCUMENTS

| | | |
|---|---|---|
| CA | 2120899 | 11/1994 |
| CA | 2234184 A1 | 10/1999 |
| FR | 2317126 A1 | 2/1977 |

* cited by examiner

*Primary Examiner* — Christopher P Jones
(74) *Attorney, Agent, or Firm* — Maxey Law Offices PLLC; Stephen Lewellyn

(57) ABSTRACT

A transport tank with high capacity gas scrubbing includes a vertically extending interior wall horizontally dividing the transport tank into a gas scrubbing chamber and a fluid storage chamber. A floor grate is supported within the gas scrubbing chamber at vertically spaced distance from a bottom of the transport tank and defines a gas distribution space between the floor grate and the tank bottom. A gas distribution pipe is disposed within and longitudinally extends the gas distribution space. A gas inlet is fluidically connected to the gas distribution pipe and passes through an exterior wall of the transport tank. A gas scrubbing is material disposed within the gas scrubbing chamber above the floor grate. And a gas outlet is fluidically connected to the gas scrubbing chamber for venting scrubbed gases.

5 Claims, 3 Drawing Sheets

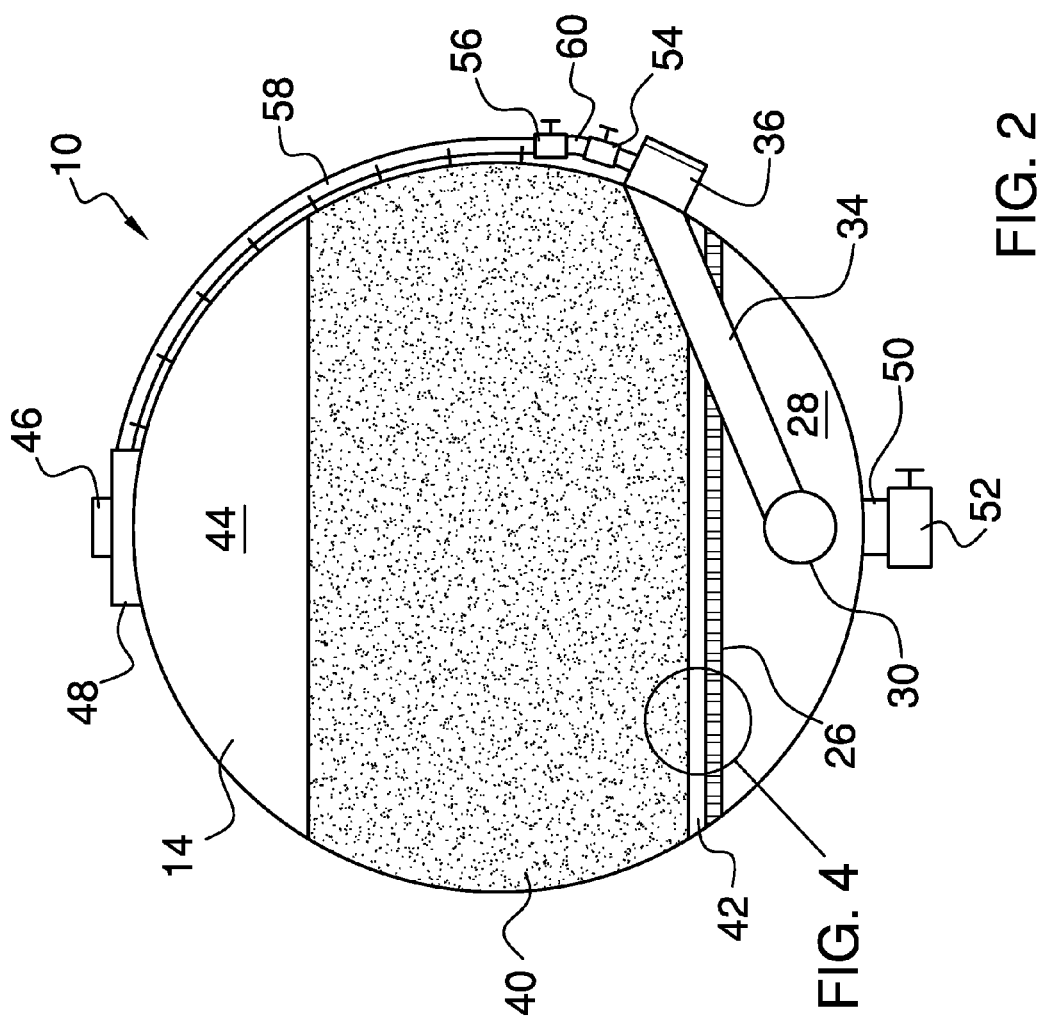

TRANSPORT TANK WITH HIGH CAPACITY GAS SCRUBBING

FIELD OF THE INVENTION

The present invention relates generally transport tanks and gas scrubbing, and more particularly, relating to a transport tank having a high flow and high capacity internal gas scrubber.

BACKGROUND OF THE INVENTION

When hazardous liquid and solid materials are loaded into a transport tank for storage and shipping the materials often evolve a vapor or gas which are highly objectionable because of odor, flammability and/or toxicity. Often these vapors or gases include hydrogen sulfide and mercaptans which are extremely toxic to the environment.

As these materials are loaded into a transport tank the air within the tank including any vapor or gas that has evolved from the material is displaced from the tank and vented to the atmosphere. It is undesirable to directly vent this gas to the atmosphere due to obvious environmental concerns and to the risk of explosion from the gas being ignited.

There exist small scale gas scrubbing devices that are installed in line with the gas vent of the transport tank for the purpose of venting small amounts of evolved gas during transport. An example of such a device is described in Canadian published application no. CA2120899. Drawbacks to these devices include the limited volume of gas that may be scrubbed before having to replace the scrubber, the relative low flow rates within which they are operable, and being externally disposed and at risk to damage. Because of these drawbacks, these devices are not suitable for scrubbing gas vented during loading of the transport tank, and rather, they are better suited to scrubbing lower volumes of gas that are evolved from the material during actual transport.

Another gas scrubbing device includes a bath of liquid through which evolved gases are bubbled up so that harmful constituents may be reacted with the liquid and removed from the gas prior to venting. Liquid bath scrubbers have numerous drawbacks that have prevented wide adoption of their use. These drawbacks include the risk of spilling the liquid and thus creating an environmental hazard, having to frequently test the liquid for strength, and the relative high head pressures that must develop within the transport tank before any gas is able to pass through the liquid bath.

Accordingly, there is a need for a new gas scrubber that overcomes the disadvantages discussed above and other inherent disadvantages existing in currently available gas scrubbers.

SUMMARY OF THE INVENTION

Embodiments of the present invention address this need by providing a transport tank with high capacity gas scrubbing capable of scrubbing gas during loading of the transport tank.

In general, in one aspect, the transport tank includes a vertically extending interior wall horizontally dividing the transport tank into a gas scrubbing chamber and a fluid storage chamber. A floor grate is supported within the gas scrubbing chamber at vertically spaced distance from a bottom of the transport tank and defines a gas distribution space between the floor grate and the tank bottom. A gas distribution pipe is disposed within and longitudinally extends the gas distribution space. A gas inlet is fluidically connected to the gas distribution pipe and passes through an exterior wall of the transport tank. A gas scrubbing is material disposed within the gas scrubbing chamber above the floor grate. And a gas outlet is fluidically connected to the gas scrubbing chamber for venting scrubbed gases.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings:

FIG. 2 is a diagrammatic cross sectional view of a gas scrubber of the transport tank taken along line 2-2 in FIG. 1;

DETAILED DESCRIPTION OF THE INVENTION

Figure 1:
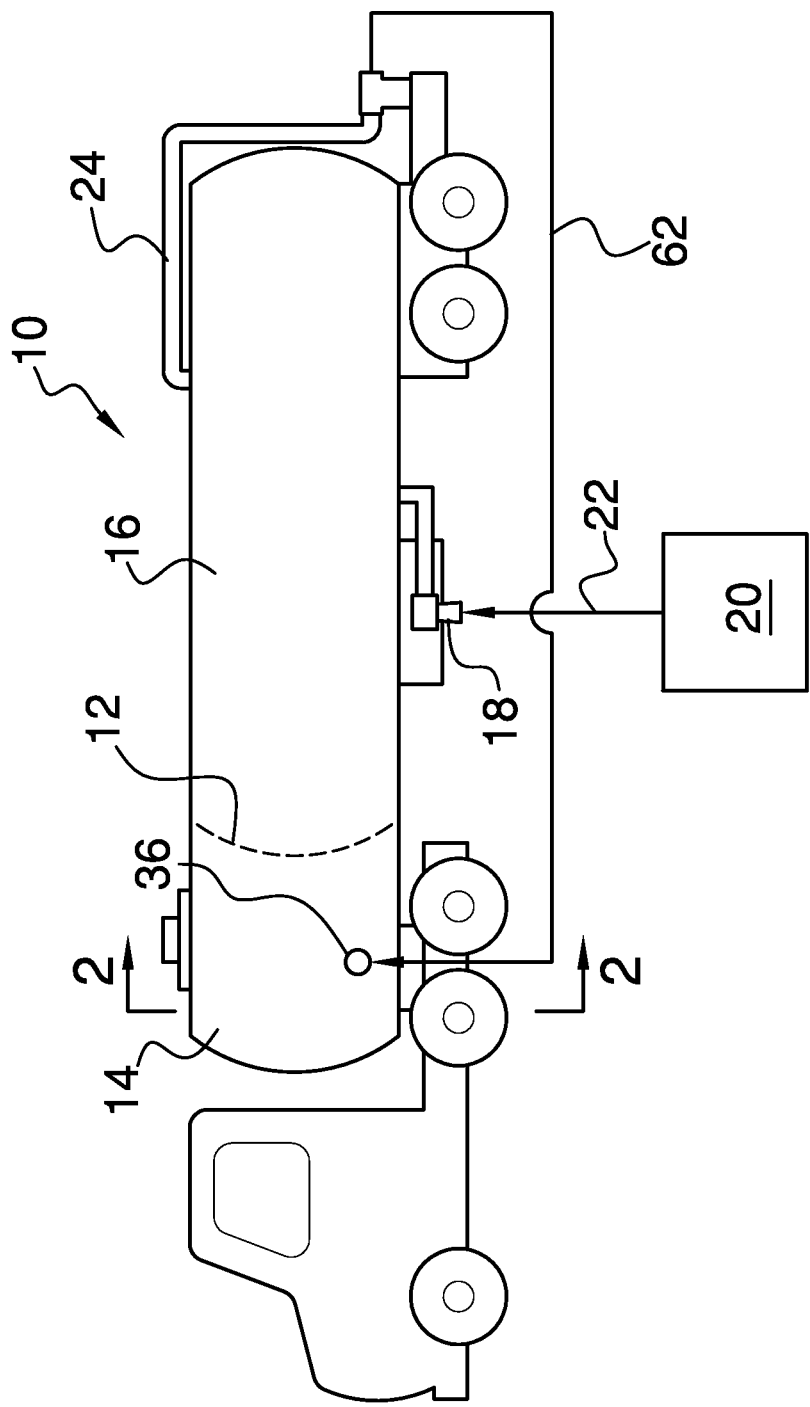
FIG. 1 is a diagrammatic side view of a transport tank with high capacity gas scrubbing constructed in accordance with the principles of an embodiment of the present invention.
Figure 4:
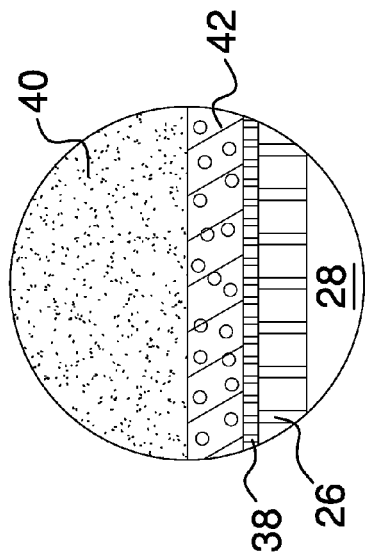
FIG. 4 is an enlarge view taken at circle 4 in FIG. 2.
Figure 3:
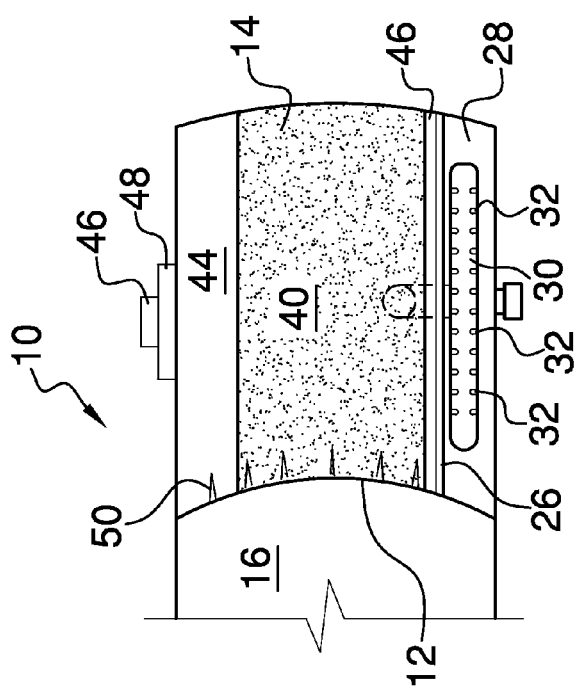
FIG. 3 is a diagrammatic cross sectional view of the gas scrubber taken along line 3-3 in FIG. 2.

In FIGS. 1 through 4 there is diagrammatically represented a new transport tank 10 in accordance with an embodiment of the present invention. Transport tank 10 includes a vertically extending internal bulkhead or wall 12 that horizontally divides the interior of the tank into a gas scrubbing chamber 14 and a fluid and/or solid receiving chamber 16. Gas scrubbing chamber 14 is sealed from fluid chamber 16 by wall 12 such that fluids, solids, or gas are prevented from migrating between the chambers internally within the tank 10.

Similar to a conventional transport tank, tank 10 includes one or more conventional pipe connections 18 that is fluidically connected to fluid chamber 16 and that is configured to be connected to a source fluid 20 via a connection line 22 for filling fluid chamber 16 with the source fluid. Additionally, tank 10 includes a gas vent 24 in fluidic communication with fluid chamber 16 to receive vent gas from the fluid chamber as the fluid chamber is filled with source fluid 20. Conventionally, gas vent 24 operates to vent the gas to the atmosphere as the tank is filled. As will be discussed further below, rather than conventionally venting the gas directly to the atmosphere, the present invention operates to feed vent gas to the gas scrubbing chamber 14 to scrub the gas free of harmful constituents prior to being vented to the atmosphere.

Gas scrubbing chamber 14 is fitted with a floor grate 26 that is supported at a vertically spaced distance from the bottom of the tank 10 to provide for a space 28 within which is disposed a gas distribution pipe 30 that extends longitudinally within space 28 and which is likewise vertically supported above the bottom of the tank. Distribution pipe 30 is perforated 32 or the like along its length to distribute gas flowing through the distribution pipe along space 28. Feed pipe 34 is fluidically connected at one end to the distribution pipe 30 and at the opposite end it is fitted with a conventional pipe connection 36 at a position exteriorly of tank 10. Pipe connection 36 allows the connection of a pipe or hose to the feed pipe 34 to receive a flow of gas for distribution within space 28 via the distribution pipe 30.

Supported on or above the floor grate 26 is a fine mesh screen 38 that serves to prevent particulate gas scrubbing material 40 from falling through the floor grate 26 and into space 28. In addition to mesh screen 38, an activated carbon foam mat 42 may be provided and disposed above mesh screen 38 and below gas scrubbing material 40 to further prevent the scrubbing material from falling through to space 28. Additionally, activated carbon foam mat 42 operates as pre-scrub to gas flowing upwardly from space 28 through the activated carbon foam mat prior to flowing through the gas scrubbing material 40. Once the gas migrates vertically upward in the gas scrubbing chamber 14 through the gas scrubbing material 40 and optionally the activated carbon foam mat 42 it is collected within space 44 and then vented to atmosphere through vent 46. Vent 46 may be formed through the closure of man way 48 or may be formed directly through tank 10 and into scrubbing chamber 14.

In an embodiment, gas scrubbing material 40 is a material that performs to remove hydrogen sulfides ($H_2S$) and mercaptans from the gas as it flows through the scrubbing material prior to the gas being released into the atmosphere. In embodiment, gas scrubbing material 40 is comprised of a high porosity mixed iron-oxide tightly bound on a stable hydroscopic inert base, such as, for example, the material sold by Tyler Chemicals Ltd under the name OCP 1100. Of course other scrubbing materials could be substituted or used in combination as required to meet the desired gas scrubbing performance.

Man way 48 provides access to the interior of the scrubbing chamber 14 to permit inspection of the scrubbing chamber, removal and replacement of scrubbing material 40, and repair of various components disposed within the scrubbing chamber. A ladder 50 may be attached or mounted to wall 12 to permit an operator to enter the scrubbing chamber 14 from man way 48.

Tank 10 further includes a drain 50 fluidically connected with space 28 in the scrubbing chamber 14 to permit draining of condensate and other fluids that have separated from the gas flowing from distribution pipe 30. A valve 52 is connected to drain 50 and is operated to open and close the drain as desired to drain fluids from the scrubbing chamber 14.

Tank 10 also includes the ability to test gas flowing through feed pipe 34 and/or to test gas vented from the scrubbing chamber 14. In an embodiment, a first isolation valve 54 is fluidically connected to feed pipe 34, such as, for example, via pipe connection 36. A second isolation valve 56 is fluidically connected to space 44, such as, for example, a fluid connection made to man way 48, vent 46 or directly through tank 10 by conduit or pipe 58 that extends along the exterior of the tank 10. The first isolation valve 54 and the second isolation valve 56 are fluidically connected via a test port 60 or the like. To test the gas flowing into the scrubber chamber 14 valve 56 is closed to isolate test port 60 from gas in space 44, and valve 54 is opened to allow gas flowing through feeder pipe 34 to likewise flow to the test port for testing. Similarly, to test gas in space 44 that is being vented to atmosphere, valve 52 is closed to isolate the test port 60 from gas flowing through feed piper 34, and valve 52 is opened to allow a gas to flow from space 44 through pipe 58 and to the test port for testing.

In use, it can now be understood, to scrub gas that is displaced and/or let off from material 22 being loaded into fluid chamber 16 of tank 10, vent 24 is fluidically connected to feeder pipe 34 by conduit or hose 62. Gas flowing through vent 24 is feed through hose 62 and into feeder pipe 34 where it is distributed within space 28 as it flows from distribution pipe 30. Gas flowing from the distribution pipe 30 and into space 28 migrates vertically within the gas scrubbing chamber 14 through the scrubbing material 40 and activated carbon foam mat 42. As the gas flows through the scrubbing material 40 and activated carbon foam mat 42, harmful constituents are removed from the gas prior to entering space 44 and then being vented to atmosphere via vent 46.

It is also important to note that the gas scrubbing component of tank 10 may be used as a standalone gas scrubber to scrub gas vented from other equipment by connecting the respective equipment's gas vent to the gas scrubber via connection 36. Additionally, the system described herein can also be used in connection with vacuum tanks that are generally used to vacuum up solid waste, or sludge that tank trucks cannot handle. Moreover, the system described herein provides for a high capacity and high flow gas scrubbing of vent gas that heretofore gas not been obtainable.

A number of embodiments of the present invention have been described. Nevertheless, it will be understood that various modifications may be made without departing from the spirit and scope of the invention. Accordingly, other embodiments are within the scope of the following claims.

What is claimed is:

1. A transport tank with a vent gas scrubber, comprising:
   a vertically extending interior wall horizontally dividing the transport tank into a gas scrubbing chamber and a fluid storage chamber;
   a floor grate supported within the gas scrubbing chamber at vertically spaced distance from a bottom of the transport tank and defining a gas distribution space between the floor grate and the tank bottom;
   a gas distribution pipe disposed within and longitudinally extending the gas distribution space;
   a gas inlet fluidically connected to the gas distribution pipe and passing through an exterior wall of the transport tank;
   a gas scrubbing material disposed within the gas scrubbing chamber above the floor grate; and
   a gas outlet fluidically connected to the gas scrubbing chamber for venting scrubbed gases.

2. The transport tank of claim 1, further comprising:
a fine mesh screen disposed between the floor grate and the gas scrubbing material.

3. The transport tank of claim 1, further comprising:
an activated carbon foam mat disposed between the gas scrubbing material and the floor grate.

4. The transport tank of claim 1, further comprising:
a first isolation valve fluidically connected to the gas inlet to receive a proportion of gas flowing through the gas inlet;
a second isolation valve fluidically connected to the gas scrubbing chamber to receive a flow of scrubbed gas; and
the first isolation valve and the second isolation valve fluidically connected to a test port.

5. The transport tank of claim 1, further comprising:
a gas vent fluidically connected to the fluid storage chamber; and
wherein the gas vent is fluidically connected to the gas inlet to receive gas from the fluid storage chamber that is vented through the gas vent.

* * * * *